(12) United States Patent
Sowles et al.

(10) Patent No.: US 10,363,819 B2
(45) Date of Patent: Jul. 30, 2019

(54) METER CLUSTER ASSEMBLY (71) Applicant: TOYOTA MOTOR ENGINEERING & MANUFACTURING NORTH AMERICA, INC., Erlanger, KY (US)

(72) Inventors: Samuel L. Sowles, Tecumseh, MI (US); James R. Sand, Farmington Hills, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/725,926

(22) Filed: Oct. 5, 2017

(65) Prior Publication Data
US 2019/0105987 A1  Apr. 11, 2019

(51) Int. Cl.
*B60K 37/02*  (2006.01)
*B60K 37/04*  (2006.01)

(52) U.S. Cl.
CPC .............. *B60K 37/02* (2013.01); *B60K 37/04* (2013.01); *B60K 2350/40* (2013.01); *B60K 2350/941* (2013.01); *B60K 2350/943* (2013.01)

(58) Field of Classification Search
CPC ... B60K 37/02; B60K 37/04; B60K 2350/941
USPC ..................... 296/70, 1.08; 180/90
See application file for complete search history.

(56) References Cited

U.S. PATENT DOCUMENTS

| | | |
|---|---|---|
| 4,555,255 A | 11/1985 | Kissel |
| 5,823,602 A | 10/1998 | Kelman et al. |
| 5,873,749 A * | 2/1999 | Takiguchi .............. B60K 37/00 174/72 A |
| 6,476,320 B1 | 11/2002 | Ritter et al. |
| 6,543,904 B1 | 4/2003 | Martinez-Gottschalk et al. |
| 7,036,865 B2 | 5/2006 | Sato et al. |
| 7,356,954 B2 | 4/2008 | Shimizu et al. |
| 8,011,709 B2 * | 9/2011 | Senakiewich, II .... B60R 13/025 24/289 |
| 8,232,482 B2 | 7/2012 | Arbel |
| 8,444,202 B2 | 5/2013 | Casey et al. |
| 8,457,839 B2 | 6/2013 | Schneider et al. |

(Continued)

FOREIGN PATENT DOCUMENTS

| | | |
|---|---|---|
| JP | 8-119000 A | 5/1996 |
| KR | 2002-0049619 A | 6/2002 |
| KR | 10-2006-0025047 A | 3/2006 |

*Primary Examiner* — Dennis H Pedder (74) *Attorney, Agent, or Firm* — Oblon, McClelland, Maier & Neustadt, L.L.P.

(57) ABSTRACT

A meter cluster assembly including a bezel and a meter cluster body for an instrument panel. The bezel includes a finished surface on an aspect, with at least one tab and a plurality of interspaced fins on an opposite aspect. The fins are of sufficient dimensions to, in part, provide the structural integrity necessary to reduce the profile of the finished surface. The fins and tabs allow for seating of the bezel within a trench of the meter cluster body, thus framing the instrument panel. The meter cluster body is generally a wall bounding a space configured to accommodate meters. The meter cluster body includes a lip at the front edge of the wall. The lip may provide a tactile feature and may provide indicia on a visible surface, aiding installation of a clip disposed on a hidden surface of the meter cluster body.

13 Claims, 6 Drawing Sheets

(56) References Cited

U.S. PATENT DOCUMENTS

| | | | |
|---|---|---|---|
| 8,876,183 B2* | 11/2014 | Tuomisto | B60R 13/0206 |
| | | | 296/1.08 |
| 8,910,991 B2 | 12/2014 | Mildner | |
| 2003/0141738 A1* | 7/2003 | Straesser, Jr. | B60K 37/00 |
| | | | 296/70 |
| 2008/0216579 A1 | 9/2008 | Hoffman | |
| 2013/0234474 A1* | 9/2013 | Coakley | B60R 13/04 |
| | | | 296/210 |
| 2016/0264052 A1 | 9/2016 | Lynam et al. | |

* cited by examiner

METER CLUSTER ASSEMBLY

BACKGROUND

A meter cluster assembly is used in a variety of applications, including in a motor vehicle to bound the space occupied by an instrument panel (e.g., speedometer, odometer, etc.). Further, meter cluster assemblies facilitate proper installation of the instrument panel assembly to the instrument panel. Functionally, the meter cluster assembly includes a meter cluster body and a front facing, aesthetically pleasing, bezel. For both of these components, traditional approaches lead to inefficiencies in manufacturing and installation.

Current meter cluster bodies include a clip for attachment to the instrument panel. These clips are disposed on the back side of the meter cluster body and thus hidden from the view of the installer. During installation, a predetermined amount of force must be applied in order to engage the clips on the hidden surface of the meter cluster body with the instrument panel.

Completing the meter cluster assembly, current bezel design consists of a finished surface attached to the meter cluster body via continuous fin on the opposite surface. Manufacturing practice requires aspects of the bezel to be of certain structural dimensions so that any bending and/or torsion that may occur during installation do not damage the bezel. In some instances, this requires these aspects to be of undesirable dimensions and may lead to a large-profile, aesthetically-displeasing finished surface that lessens the experience for the end user.

SUMMARY OF THE ILLUSTRATIVE EMBODIMENTS

The present disclosure provides for a meter cluster assembly having a meter cluster body and a bezel. The meter cluster body provides a wall defining a space generally configured to accommodate meters of the type typically found in motor vehicle instrument panels. On at least one aspect of the visible surface of the meter cluster body, a lip provides at least one tactile surface and indicia (e.g., a numerical marking). In the present disclosure, these aspects indicate the location at which a predetermined force must be applied so that a clip, on the hidden face of the meter cluster body opposite the tactile feature, will be co-located with its corresponding location on the instrument panel. Without these aspects, the installer risks off-target force applications which may lead to production delays associated with dislocation or other damage to the hardware. The indicia facilitate sequential installation of the clips and may indicate the total number of clips to be engaged.

Further, the meter cluster body provides a trench for attachment of the bezel. The bezel provides a finished surface projecting radially away from die instrument panel and a plurality of fins and at least one tab arranged on the opposite surface for engagement with the trench of the meter cluster body. The at least one tab is located at predetermined intervals along the hidden surface of the bezel. The fins, of dimensions appropriate for engagement with the trench of the meter cluster body, project from the hidden surface of the bezel for predetermined lengths and at predetermined intervals along the remaining length of the bezel. The bezel is designed to minimize form factor while maintaining structural integrity.

The foregoing paragraphs have been provided by way of general introduction, and are not intended to limit the scope of the following claims.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Where applicable, some or all features may not be illustrated to assist in the description of underlying features. In the drawings.

DETAILED DESCRIPTION OF THE PREFERRED EMBODIMENTS

The description set forth below in connection with the appended drawings is intended as a description of various embodiments of the disclosed subject matter and is not necessarily intended to represent the only embodiment(s).

It is to be understood that terms such as "front," "rear," "bottom", "top" and the like that may be used herein merely describe points of reference and do not necessarily limit embodiments of the present disclosure to any particular orientation or configuration.

Figure 1:
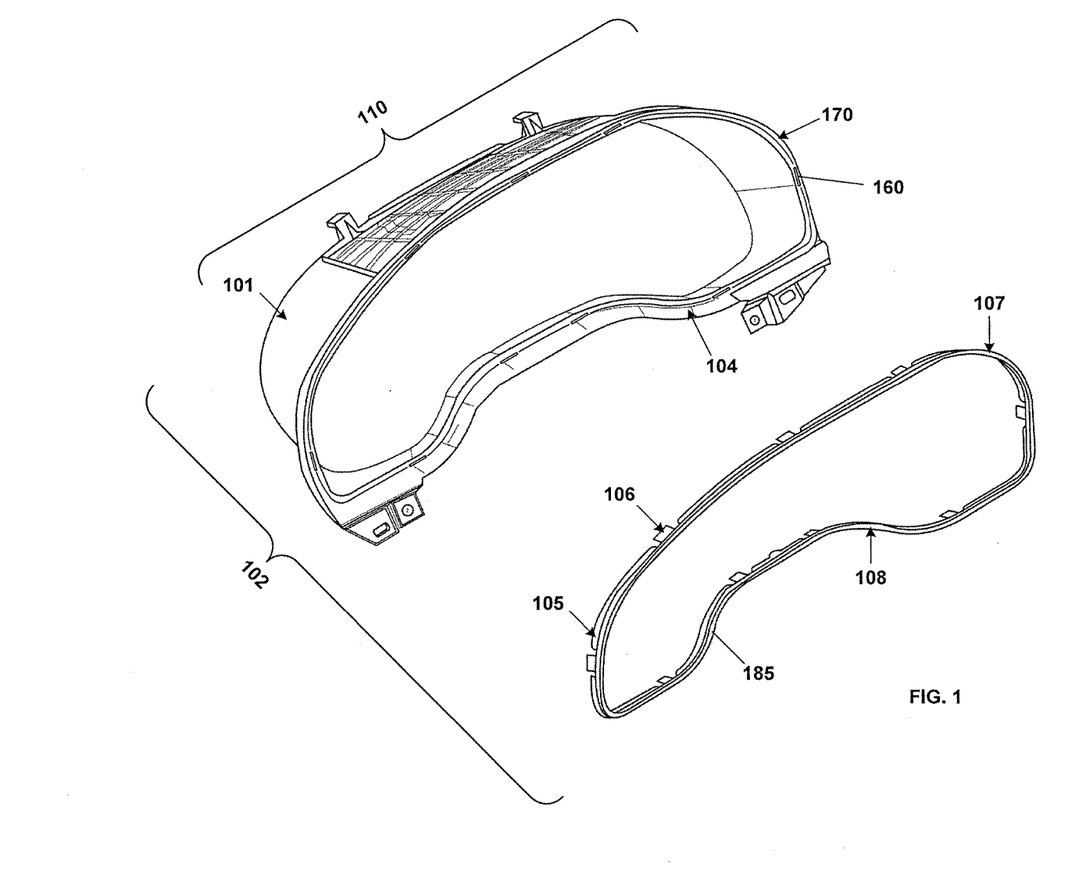
FIG. 1 is a perspective view of a meter cluster assembly.

FIG. 1 is an illustrative depiction of a perspective view of a meter cluster assembly 102. The meter cluster assembly 102 includes a meter cluster body 110 having a wall 101 bounding a space configured to accommodate meters of the type normally found in instrument panels. A proximal end of the wall 101 includes a trench 104. In an embodiment, the trench 104 includes a channel and at least one tab attachment location 160 at predetermined positions. In an exemplary embodiment, the trench 104 includes a discontinuous channel along the length of the trench 104 and the at least one tab attachment location 160 is disposed at predetermined positions not in the discontinuous channel. The meter cluster assembly 102 further includes a bezel 108. The bezel 108 includes a finished surface 107 on a visible aspect 185 of the bezel 108 and a plurality of fins 105 extending radially from a hidden aspect of the bezel 108. The plurality of fins 105 are dimensioned to be seated within the channel of the trench 104 of the meter cluster body 110. In an exemplary embodiment, the plurality of fins 105, dimensioned to align the bezel 108 to the channel of the trench 104, are discontinuous and interspaced with at least one tab 106 configured to engage corresponding tab attachment locations 160 in the trench 104. In this embodiment, the tabs 106 of the bezel 108 are exemplary of a variety of methods for joining two components. The finished surface 107 in an embodiment may be chrome. In other embodiments, the tabs 106 may provide indicia (e.g. numerical markings) for sequential installation of the bezel 108 and to indicate to the installer the total number of tabs 106 needed to be engaged. Such numerical markings are described in FIG. 6A, wherein the at least one tab 106 has corresponding indicia embossed sequentially on the finished surface 107, or visible aspect 185, of the bezel 108.

Figure 2:
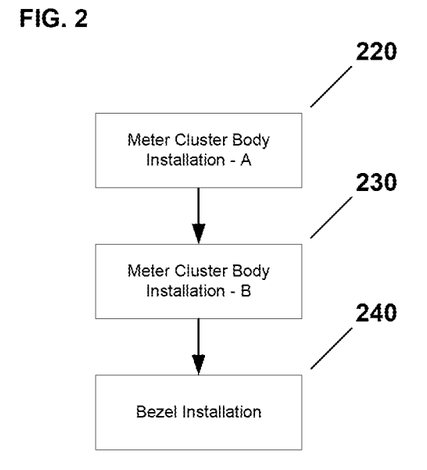
FIG. 2 is a flowchart of meter cluster assembly, including attachment of the meter cluster body and the bezel.

FIG. 2 is a flowchart of installation of a meter cluster assembly. A meter cluster body is first engaged with an instrument panel. A first clip on a hidden surface of a lip corresponding to a tactile feature on the visible surface of the lip of the meter cluster body is engaged via predetermined push force with the instrument panel 220. Sequential clips of the meter cluster body are engaged with the instrument panel, according to indicia, until all clips are engaged 230. Following installation of the meter cluster body, a bezel is engaged with the proximal end of a wall of the meter cluster body. A plurality of fins is used to align the bezel within a channel of a trench of the meter cluster body. A predetermined push force is applied to the bezel to engage a first of at least one tab with the corresponding tab attachment locations on the trench of the meter cluster body 240. If more than one tab is present, tabs are engaged sequentially, according to indicia.

Figure 3:
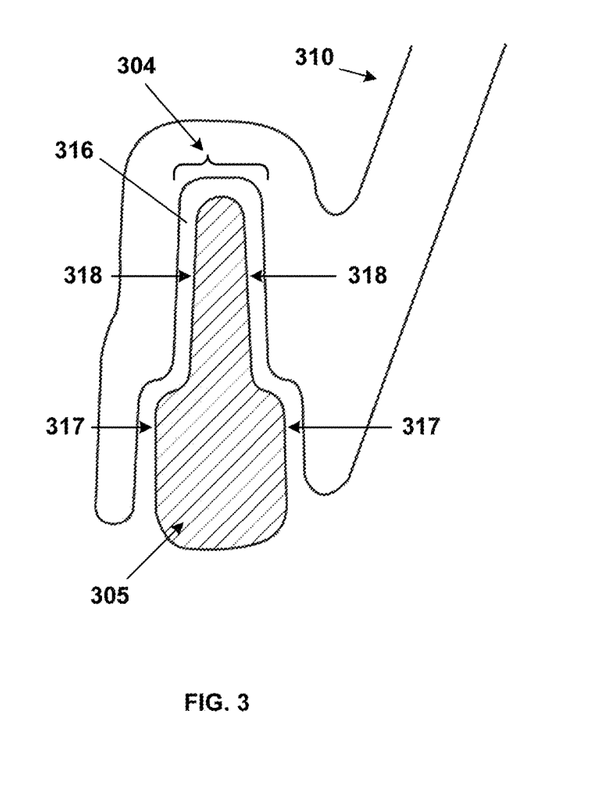
FIG. 3 is a cross-sectional view of the trench and fin engagement of the meter cluster assembly.

FIG. 3 depicts a cross section illustrating a fin 305 engaged within the channel 316 of the trench 304 of the meter cluster body 310. In an exemplary embodiment, the fin 305 is a protrusion of tapered design, with the distal portion of the fin 318 being narrower than the proximal portion of the fin 317 in a stepwise manner. Limited by the cross sectional perspective of this representation, the fin may further extend in both directions along a predetermined length of the bezel. The channel 316 of the trench 304 is designed as a negative mold of the plurality of fins 305. In other embodiments, the plurality of fins and channel may be other shapes or may be multiple different cross sectional shapes. The dimensions of the plurality of fins 305 provide structural integrity to the bezel (not shown) and allow for improved alignment within the trench 304.

Figure 4:
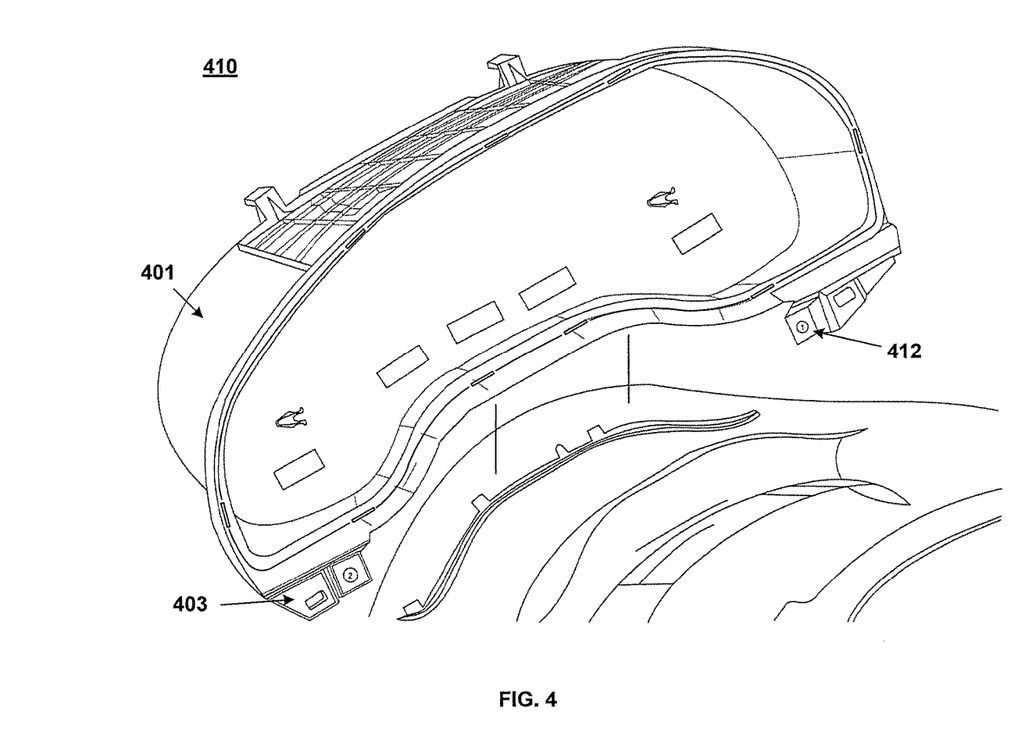
FIG. 4 is a perspective view of a meter cluster body.

FIG. 4 is an illustrative depiction of a perspective view of the meter cluster body 410 as related to the instrument panel. The wall 401 defines an open space generally configured with meters and the lip 403 is disposed on a proximal edge of the wall 401. A tactile feature 412 is disposed on the lip 403 of the meter cluster body 410. The tactile feature 412, displayed here in an exemplary embodiment as an indent, provides a surface for the installer to apply a predetermined pushing force. The tactile feature 412 may be of any design that is distinguishing from the surrounding lip 403.

Figure 5:
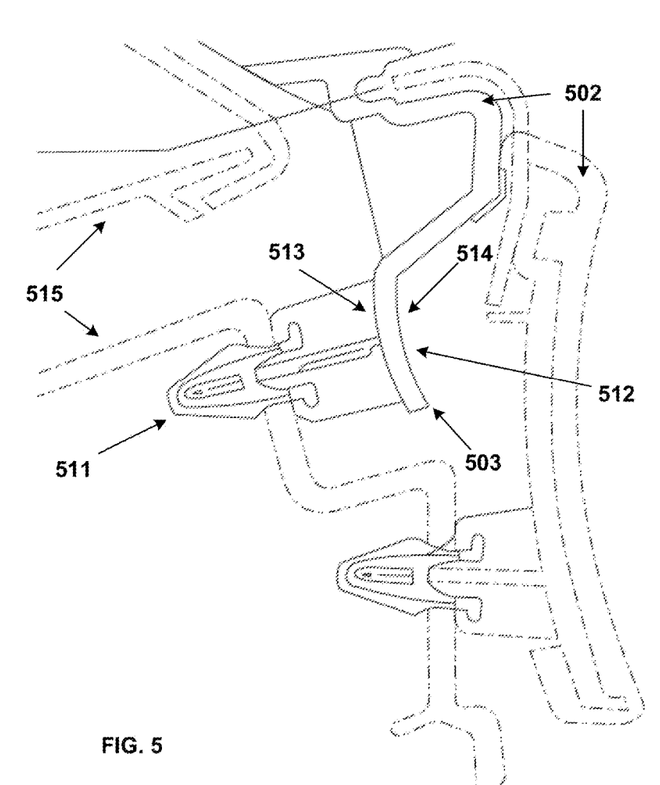
FIG. 5 is a horizontal cross-sectional view of the meter cluster assembly inserted into the instrument panel, highlighting the meter cluster body from a perspective of a vehicle occupant.

FIG. 5 is a horizontal cross-section illustrating the meter cluster assembly 502 inserted into the instrument panel 515. Solid lines are points of interest. The clip 511 is disposed on a hidden surface 513 of the lip 503. The tactile feature 512 on the visible surface 514 of the lip 503 ensures correct positioning of the clip 511 disposed opposite the tactile feature 512 on the hidden surface 513 of the lip 503, with respect to corresponding locations on the instrument panel 515. In this embodiment, the clip 511 is exemplary of a variety of methods for joining two components.

Figure 6A:
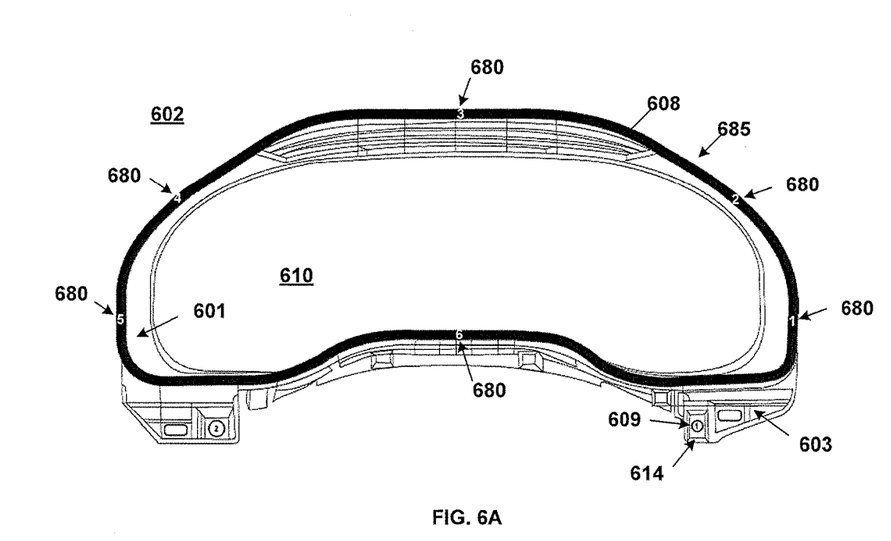
FIG. 6a is a frontal view of the meter cluster assembly, with focus directed to the lip, tactile feature, and indicia of the meter cluster body.

FIG. 6a is a front view of the meter cluster assembly 602 (e.g., as seen from a perspective of a vehicle occupant). The bezel 608 is seated in the trench (hidden) on the proximal end of the wail 601. The visible surface 614 of the lip 603 exposes indicia 609. Numerical indicia 680 are embossed on a visible aspect 685 of the bezel 608, the numerical indicia 680 corresponding to at least one tab attachment location on a hidden aspect of the bezel 608.

Figure 6B:
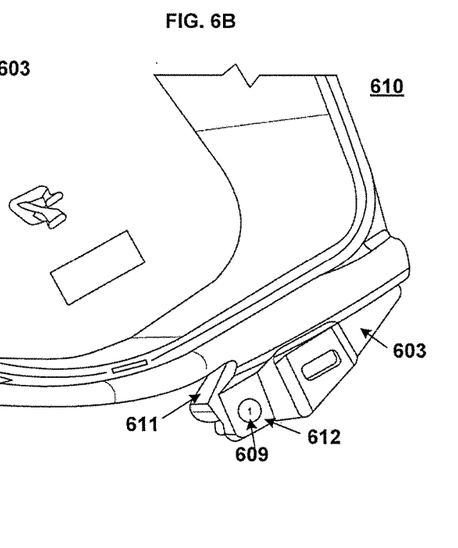
FIG. 6b is a perspective view of an aspect of the meter cluster body, highlighting the lip from a perspective of a vehicle occupant.

FIG. 6b is an illustrative depiction of a perspective view of the lip of the meter cluster body 610. The lip 603 includes a tactile feature 612. A clip 611 is disposed on the hidden surface (not visible) of the lip 603 directly opposite the tactile feature 612. In one embodiment, the tactile feature 612 is shaped such that the installer is informed where to push, aiding the installer in applying force directly onto the clip 611. Further, each tactile feature 612 of the meter cluster body 610 may contain indicia (e.g., numerical markings) 609 so as to indicate installation sequence or to indicate the number of clips 611 needing to be pushed into the instrument panel (not shown). In other embodiments, indicia 609 may be disposed on a visible surface of a meter cluster body 610 in the absence of tactile features 612.

Obviously, numerous modifications and variations of the present advancements are possible in light of die above teachings. It is therefore to be understood that within the scope of the appended claims, the present advancements may be practiced otherwise than as specifically described herein.

What is claimed is:

1. A meter cluster assembly, comprising:
   a meter cluster body including
      a wall defining an open space,
      a trench on a proximal edge of the wall, the trench having a discontinuous channel along a length of the trench,
      at least one tab attachment location at predetermined positions not in the discontinuous channel,
      a lip disposed on an aspect of the proximal edge of the wall, adjacent to a portion of the trench,
      a tactile feature disposed on a visible surface of the lip,
      a clip disposed on a hidden surface of the lip, opposite the tactile feature; and
   a bezel including
      a finished surface projecting radially from a visible aspect,
      a plurality of fins projecting radially from a hidden aspect, and
      at least one tab projecting from the hidden aspect.

2. The meter cluster assembly of claim 1, wherein each fin is:
   discontinuous; and
   of variable length along the hidden aspect of the bezel.

3. The meter cluster assembly of claim 1, wherein each fin is a protrusion designed with a distal portion being narrower than a proximal portion, in a stepwise manner.

4. The meter cluster assembly of claim 1, wherein the at least one tab is located at predetermined locations along the hidden aspect of the bezel.

5. The meter cluster assembly of claim 1, wherein the at least one tab has corresponding indicia embossed sequentially on the visible aspect of the bezel.

6. The meter cluster assembly of claim 5, wherein the indicia is a numerical marking.

7. The meter cluster assembly of claim 1, wherein the discontinuous channel is designed as a negative mold of the fin.

8. The meter cluster assembly of claim 1, wherein the tactile feature indicates where a force should be applied for proper engagement of the clip which is hidden during assembly.

9. The meter cluster assembly of claim 1, wherein indicia is disposed on the visible surface.

10. The meter cluster assembly of claim 9, wherein the indicia is a numerical marking.

11. A method of installation of a meter cluster assembly including a meter cluster body, having a wall defining an open space, a trench on a proximal edge of the wall, a lip disposed on an aspect of the proximal edge of the wall, adjacent to a portion of the trench, a tactile feature disposed on a visible surface of the lip, and a clip disposed on a hidden surface of the lip, opposite the tactile feature, comprising:

applying a force to the meter cluster body to ensure engagement of the clip with an instrument panel as indicated according to tactile features of the meter cluster body; and installing the meter cluster body via sequential force application, as indicated by indicia, to engage the meter cluster body with the instrument panel.

12. The method of installation of claim 11, wherein the indicia is a numerical marking.

13. The method of installation of claim 11, including a bezel having a finished surface projecting radially from a visible aspect, at a plurality of fins projecting radially from a hidden aspect, and at least one tab projecting from the hidden aspect, comprising:

installing the bezel using at least one fin on a hidden aspect of the bezel for alignment of the bezel with a channel of a trench of the meter cluster body, installing the bezel using the at least one tab on the hidden aspect of the bezel for securing the bezel within the channel of the trench of the meter cluster body; and applying an installation force sequentially, according to the indicia on the visible aspect of the bezel, to engage the bezel with the trench of the meter cluster body.

\* \* \* \* \*